United States Patent [19]

Frommelt

[11] 4,381,631
[45] May 3, 1983

[54] LOADING DOCK SHELTERS
[75] Inventor: Sylvan J. Frommelt, Peosta, Iowa
[73] Assignee: Frommelt Industries, Inc., Dubuque, Iowa
[21] Appl. No.: 258,564
[22] Filed: Apr. 29, 1981
[51] Int. Cl.³ .......................................... E04H 14/00
[52] U.S. Cl. ............................................. 52/173 DS
[58] Field of Search .............. 52/173 DS, 3; 135/5 A; 160/277

[56] References Cited
U.S. PATENT DOCUMENTS

| Re. 28,391 | 4/1975 | Frommelt et al. | 52/173 DS |
|---|---|---|---|
| 875,997 | 1/1908 | Hopkins | 160/277 |
| 1,854,438 | 4/1932 | Wray | 52/145 |
| 1,986,773 | 1/1935 | Hamm | 160/277 |
| 3,230,675 | 1/1966 | Frommelt et al. | 52/173 DS |
| 3,322,132 | 5/1967 | Rieder et al. | 135/5 A |
| 3,352,314 | 11/1967 | Frommelt et al. | 52/173 DS |
| 3,403,489 | 10/1968 | Frommelt et al. | 52/173 DS |
| 3,538,655 | 11/1970 | Frommelt et al. | 52/173 DS |
| 3,557,508 | 1/1971 | Frommelt et al. | 52/173 DS |
| 3,653,173 | 4/1972 | Frommelt et al. | 52/173 DS |
| 3,699,733 | 10/1972 | Frommelt et al. | 52/173 DS |
| 3,792,559 | 2/1974 | Frommelt et al. | 52/173 DS |
| 3,826,049 | 7/1974 | Frommelt et al. | 52/173 DS |
| 4,062,157 | 12/1977 | Potthoff | 52/173 DS |
| 4,365,452 | 12/1982 | Fillman et al. | 52/173 DS |

Primary Examiner—John E. Murtagh
Assistant Examiner—Michael Safavi
Attorney, Agent, or Firm—Emrich, Lee, Brown & Hill

[57] ABSTRACT

A loading dock shelter for use around a doorway on wall, includes a flexible head cover panel, having top, bottom and side edges. Two sleeves, each sleeve secured to opposite side edges of the head panel to an intermediate area between the top and bottom edges, slidably receive two flexible elastic straps respectively. One end of each strap extends upward toward the top edge of the head panel and one end of each strap extends in a taut draped manner from the sleeve. The ends of the strap are secured in a stationary manner to the side frame member. The flexible elastic straps restrain and cushion the head panel as the head panel is subjected to outside forces reducing strain and wear, yet allowing the head curtain to yield upon engagement with a truck.

11 Claims, 6 Drawing Figures

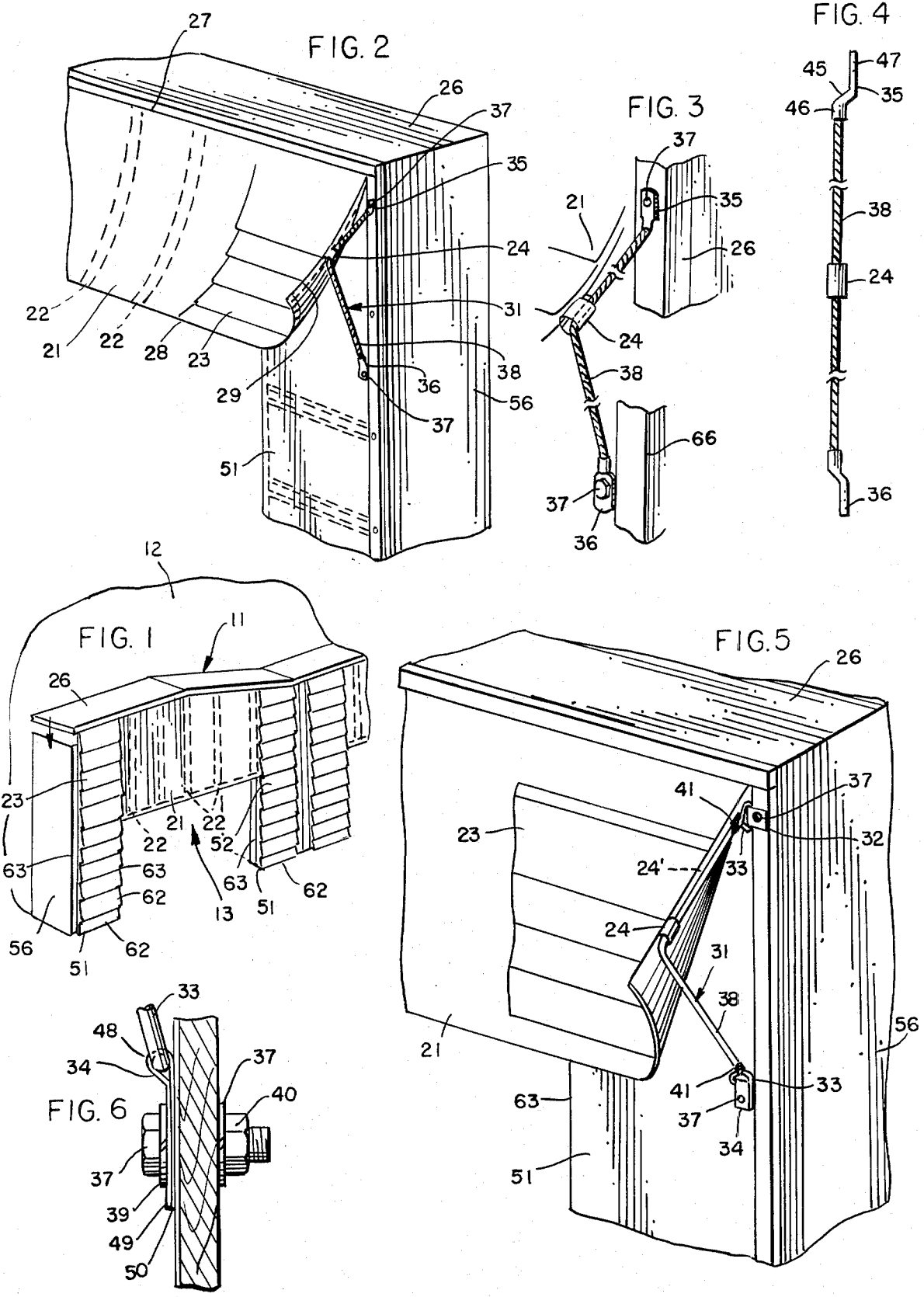

LOADING DOCK SHELTERS

BACKGROUND OF THE INVENTION

Loading dock shelters are used around doorways and openings in walls of buildings to protect the building structure from impact with a truck body and to seal the space between the truck body and the building during the loading and unloading of the contents of the truck. Also, the passage of air between the interior of the building and the outside in airconditioned or refrigerated buildings results in substantial increases in energy cost in heating and/or cooling the interior of the building.

In the past, loading dock structures have typically included a flexible head curtain or panel supported along its top edges and positioned to extend across the upper portion of a doorway or opening to sealably engage with the top of a truck body. Two side curtains or panels typically extend inwardly towards each other, downwardly from the sides of the doorway and upwardly behind the head panel to provide sealed engagement with the back of the truck body.

In such installations, the head panel, secured along its top edges, is free to flap unrestrained in the wind. The repeated flexing and snapping of the head curtain produces considerable wear and strain along the edges secured to the underlying support structure and the support ribs sewn into the material. The resultant stress and wear upon the head curtain and side panels requires their continued replacement. Also, when the head panel is permitted to flap unrestrained, the effectiveness of the seal with the truck body is greatly reduced.

SUMMARY OF THE INVENTION

The present invention is directed to a structure which restrains the free movement of head curtains in loading dock shelters, while permitting the head curtain to yield when engaged with the top of a truck body. The present invention also prevents the head panel from folding behind the side panels and further restrains the outward movement of the side panels.

The loading dock shelter of the present invention, for use around a doorway in a wall, includes a flexible head cover panel, having a top, bottom, and side edges. The head panel is supported along its top edge suitable means in position to extend across the upper portion of the doorway to sealably engage with the top of a truck. Affixed to the head curtain are two sleeves, each sleeve secured to an opposite side edge of the panel to an intermediate area between the top and bottom edge. Two flexible elastic straps, each strap having two ends and slidably received within one of the sleeves, extend upward from one of the ends towards the top edge of the head panel and extend at the other end in a taut draped manner from the sleeve. The ends of the flexible elastic straps are secured in a stationary manner to the wall means or side member frame. The flexible elastic straps restrain the top panel from blowing outwardly in wind, reducing strain and wear, yet allowing the head panel to yield upon engagement with a truck body, the elasticity of the strap cushions the travel of the head panel and absorbs the shock of sudden forces.

Two flexible side panels, also having top, bottom and side edges, can be used in conjunction with the head panel and restraining straps. Each side panel is supported along a side edge in position to extend inwardly towards each other from the sides of the doorway. The side panels extend upwardly behind the head panel and the elastic straps to sealably engage with the sides of a truck. When used in conjunction with the side panels, the elastic strap prevents the side panels from unrestrained outward movement such as that produced by wind. The restraining straps prevent the head panel from folding and wedging behind the side panels thereby maintaining the efficiency of the seal between the panels and the truck body.

Other features and advantages of the present invention will be apparent from the following description and claims and are illustrated in the accompanying drawings which show a preferred embodiment of the present invention and the principles thereof and what is now considered to be the best mode in which to apply these principles. Other embodiments of the invention embodying the same or equivalent principles may be used and structural changes may be made as desired to those skilled in the art without departing from the present invention and the purview of appended claims.

DESCRIPTION OF THE DRAWINGS

In the drawings:

FIG. 1 is a fragmentary, front elevational view of a loading dock shelter embodying the principles of the present invention; showing the shelter mounted in operative position about a doorway located in a wall;

FIG. 2 is a fragmentary front elevational view of the loading dock shelter shown in FIG. 1, illustrating in particular a portion of the head panel held by the restraining strap;

FIG. 3 is a fragmentary side elevational view of a portion of the head panel of a loading dock shelter shown in FIG. 1 and 2;

FIG. 4 is a side perspective view of the restraining strap illustrated in FIG. 3 and 2;

FIG. 5 is a fragmentary side elevational view of the loading dock shelter illustrated in FIG. 1 embodying the principles of the present invention, showing in particular a restraining strap holding the head panel;

FIG. 6 is a side perspective view of the securing means of the restraining strap illustrated in FIG. 6.

DETAILED DESCRIPTION

A loading dock shelter 11 embodying the principles of the present invention is shown in the drawings to illustrated the presently preferred embodiment of the present invention. Referring first to FIG. 1, the loading dock shelter 11 is shown mounted on an outer wall 12 in a semi-surrounding relation to a doorway 13. The loading dock shelter 11 protects the building structure from collisions with trucks and seals gaps between the truck body and the building during the loading and unloading of a truck.

The loading dock shelter 11 is comprised of the following major components: a head curtain or panel 21, two side curtains or panels 51, and support means for supporting the panels 21 and 51 about their edges in position to extend into the doorway to sealably engage with the exterior surfaces of a truck. The support means may be of any suitable type, and includes the outwardly extending upper housing 26 and the outwardly extending side housings 56.

The upper housing 26 is disposed above, and extends horizontally across the doorway 13. The side housings 56 extend downwardly from respective ends of the upper housing 26 about the sides of the doorway 13.

The housings 26 and 56 may be secured to the wall 12 by any suitable means, such as screws or bolts extending through portions of the housings 26 and 56 into the wall 12.

A flexible head cover panel 21 having top, bottom and side edges is supported along its top edge by the outwardly extending upper housing 26 in position to extend across the upper portion of the doorway. Hanging downwardly from the outwardly extending upper housing 26, the head curtain 21 sealably engages with the top exterior of a truck body as it is backed up in close proximity to the doorway 13.

Two flexible side cover panels 51 extend inwardly towards each other from the sides of the doorway and upwardly behind the head panel. The two side cover panels 51 have top 61, (not shown) bottom 62, and side 63 edges. Each side cover panel 51 is secured by suitable means to the outwardly extending side housing 56 along side edges 63 in position to extend inwardly towards each other from the sides of the doorway 13. The side cover panels sealably engage with the exterior sides of a truck body as the truck is backed up in close proximity to the doorway 13.

The panels 21 and 51 may be made of any suitable material but preferably are made of a water-repellent, wear-resistant material, such as for example, canvas duck or water impervious nylon fabric. Referring now to FIG. 2 support ribs 22 extend downwardly across the face of the head panel 21. Similar ribs (not shown) extend horizontally across the side panels 51 to support the side panels 51 in the inwardly extending position.

When wind catches the head panel 21, it causes the head panel 21 to flap upwardly. This movement is carried to the upper edge 27 where the head panel 21 secured to the upper housing 26. The movement of the head panel 21 and the flexing of the head panel material causes wear, particularly around the support ribs 22 and the upper edge 27. Violent flapping of the head curtain 21 can cause the head curtain 21 to be sheered from the upper housing 26.

Retaining means such as sleeves 24, which only one is shown, are secured to opposite side edges 29 of the head panel to an intermediate area between the top 27 and the bottom edge 28. Preferably, the sleeves 24 are positioned towards the bottom edge 28, as shown in FIG. 5, to substantially suppress the movement of most of the head panel 21 as will be evident later. Restraining means, such as restraining straps 31, (only one shown) are secured in a stationary manner to the side housings 56. Each strap 31 is slidably received within one of the sleeves 24. One end of each strap 31 extends upwardly towards the top edge 27 of the head panel 21. The opposite end extends in a taut draped manner from the sleeve 24 to a lower point on the side housing 56. Each end is secured in a stationary manner to the side housing 56. As illustrated in phantom in FIG. 5, additional sleeves 24' can be used to directly secure additional areas of the head curtain 21 to the restraining strap 21.

Referring now to FIG. 3 the restraining strap 31 includes a flexible elastic cord 38 and upper and lower anchors, 35 and 36 respectively, secured to the ends of the cord 38. Anchors 35 and 36 have planar surfaces 48 through which extends a hole 47, as best seen in FIG. 4. The anchors 35 and 36 have an outwardly projecting portion 45 extending from the planar surface 48 and into a cord securing portion 46 which clamps tightly around the cord 38. The outwardly projecting portion 45 allows the anchors 35 and 36 to fit flush against the housing 56 and minimizes wear on the cord 38 from rubbing against the housing 56. Referring again to FIG. 3, bolts 37 extend through the holes 47 and through the side housing 56 where they are secured by suitable means as a nut. Preferably, the lower anchor 36 is positioned below the head curtain 21 to avoid wear caused by the anchor 36 rubbing on the head curtain 21.

Alternatively, the ends of the flexible elastic cord 38 can be formed into a ring of cord or grommet 33 and secured by knots 41. The grommet 33 is secured to the side housings 56 by means of upper and lower fastening bands, 32 and 34 respectively, as best seen in FIGS. 5 and 6. Referring now to FIG. 6, the fastening bands 32 and 34 includes a thin flat strip folded upon itself to form a loop 48 which the grommet 33 is secured within. The loop 48 projects outward from the housing 56 to allow the lower planar surface 50 to fit flush against the housing surface and to hold the cord 38 away from the housing 56. The upper and lower planar surfaces, 49 and 50 respectively, of the fastening band 34 have holes substantially in alignment to allow bolt 37 to extend therethrough. The fastening bands 32 and 34 are secured to the side housing 56 by suitable means such as bolt 37 equipped with washers 39, extending through a fastening bands 32 and 34 and through a hole in the side housing 56, and fitted with a nut 40. Preferably the lower fastening band 34 is mounted below the head curtain 21.

The flexible elastic straps 31 restrain the head panel from blowing outwardly in wind thereby reducing strain and wear, yet allow the head panel to yield upon engagement with the top exterior of a truck body. The sleeves 24 allow the restraining straps 31 to stretch across their entire length. As the distance between the sleeve 24 and the lower fastening band 34 or lower anchor 36 is increased beyond the relaxed length of the flexible elastic cord 38, the elastic cord 38 stretches across its length, from the upper fastening band 32 or anchor 35 to the lower fastening band 34 or anchor 36, and pulled down through the sleeve 24. The elasticity of the restraining strap 31 cushions the end of the travel of the head panel 21 and absorbs the shock of sudden forces or flapping.

Two flexible curtains or panels 51 can be used in conjunction with the head panel 21 and restraining straps 31. The flexible side panels 51 also have top 61 (not shown), bottom 62 and side 63 edges. The side panels 51 are supported along side edges 63 in position to extend inwardly towards each other from the sides of the doorway 13. The side panels 51 extend upwardly behind the head panel 21 and the restraining straps 31 to sealably engage with the exterior sides of a truck body. When used in conjunction with the side panels 51, the restraining straps 31 prevents the side panels 51 from unrestrained outward movement such as that produced by a wind. The restraining straps 31 thus reduce the strain and wear caused by the violent flexing of the side panels 51 and prevent the side panels 51 from sheering about the side edges 63 secured to the side housing 56. The restraining straps 31 also prevent the head panel 21 from folding and wedging behind the side panels 51. Such a reversal of position of the side panels 51 and head panel 21 reduces the efficiency of the seal between the panels and the truck body.

To further reduce wear and strain to the head panel 21 and side panels 51, overlapping, flexible, wear resistant flaps or plates 23 are affixed along their upper edges to front truck engaging surfaces of the panels 21 and 51. Each flap 23 is free to move up and down individually of the other flaps 23. The flaps 23 flex and fold to move up and down with abutting parts of a truck body.

In operation, a truck backs up into close proximity to the doorway 13. The side curtains 51 engage the exterior sides of the truck body, the head panel 21 engages the upper exterior of the truck body. The restraining strap 31 yieldly resists movement of the head curtain 21 effective to hold the head curtain 21 in firm sealing engagement with the top of the truck body, so as to afford an effective substantially weatherproof seal therebetween. Also, the restraining strap 31 is effective to prevent dislodgement of the head curtain from its sealing engagement with the top of the truck body by outside force, such as, for example the wind, or by shifting of the truck during the loading and unloading operations.

As a truck moves forwardly out of operative engagement with the loading dock shelter 11, the head curtain 21 and side curtains 51 return to their normal at reset position. The restraining strap 31 prevents the head curtain 21 from moving freely under the influence of outside forces, such as the wind. As the head curtain 21 is lifted upward it reaches the end of its travel as the sleeve 24 pulls the restraining strap 31 upward removing slack in the cord 38. Further movement of the head panel 21 causes the flexible elastic cord 38 to stretch its entire length, pulling additional amounts of stretched elastic cord 38 through the sleeve 24 thereby cushioning the end of the head curtain's 21 travel in the upward direction.

Side panels 51 are restrained in their outward movement by the head panel 21 and the restraining straps 31. Violent flapping motions of both the head panel 21 and the side panels 51 are reduced and cushioned by the restraining strap 31. Further, the restraining strap 31 prevents the side panels 51 from extending outwardly and folding back upon the head panel 21.

It will be seen that the present invention affords a novel loading dock shelter which is practical and efficient in operation, and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes in alternations as which fall within the purview of the following claims.

I claim:

1. A loading dock shelter for use around a doorway in a wall, comprising:
    a. a flexible head cover panel, extending the width of said doorway, said head panel having top, bottom and side edges;
    b. support means for supporting said head panel along its top edge to extend across the upper portion of said doorway to sealably engage with the top of a truck body;
    c. at least one retaining means affixed about one of said side edges of said head panel in an intermediate position between the bottom and top edges of said head panel;
    d. at least one flexible elastic restraining means having an intermediate portion and end portions, said intermediate portion slidably received within said retaining means and said end portions in a fixed position secured relative to said wall, said retaining means allowing said restraining means to stretch along its length pulling additional portions of said restraining means through said retaining means;
    e. said restraining means cushioning the movement of said head panel maintaining operable alignment of the head panel.

2. The loading dock shelter of claim 1 wherein said retaining means is affixed about one of said side edges of said head panel in an intermediate position between the bottom and top edges of said head panel slidably securing said restraining means to said head panel, said restraining means having one end portion draping from said retaining means and secured in a stationary manner relative to said wall means, and one end portion extending upward from said retaining means and secured about said top edge of said head panel, allowing said restraining means to stretch along its length pulling additional portions of the restraining means through the said retaining means.

3. The loading dock shelter of claim 2 wherein said retaining means is positioned toward said bottom edge of said head panel to suppress the movement of most of the head panel.

4. The loading dock shelter of claim 2 wherein said end portion of restraining means extending upward from said retaining means is secured in a stationary manner relative to said wall beneath said head panel.

5. The loading dock shelter of claim 4 wherein said restraining means further comprises a flexible elastic cord having a ring positioned at each end of said cord; two looped bands, each band including a loop and having a fastening hole, said loop for receiving one of said rings; and fastening means extending through said holes and securing said looped bands in a stationary manner relative to said wall, said looped band allowing said ring to rotatably shift within said loop to adjust for movement of said head panel.

6. The loading dock shelter of claim 4 wherein said restraining means further comprises a flexible elastic cord having anchors affixed to each end of said flexible elastic cord, said anchors including a flat planar surface having a hole, fastening means extending through said hole and securing said anchor in a stationary manner relative to said wall means, and an outwardly projecting cord securing portion encircling said cord and clamping tightly therearound securing said cord in said anchor.

7. The loading dock shelter of claim 1 further comprising:
    a. at least one flexible side cover panel having top, bottom and side edges;
    b. side panel support means for supporting said side panel along a side panel side edge in position to extend inwardly from the side of said doorway and downwardly from behind said head panel and restraining means to sealably engage said side panel with a side of a truck;
    c. said restraining means suppressing and cushioning the outward movement of said side panels.

8. The loading dock shelter of claim 1 further comprising overlapping, flexible, wear resistant flaps affixed along their upper edges to the truck engaging surfaces of said head panel, allowing said flaps to move up and down with abutting parts of a truck body reducing wear and strain on said head panel.

9. The loading dock shelter of claim 7 further comprising overlapping, flexible, wear resistant flaps affixed along their upper edges to the truck engaging surfaces of said head panel and said side panel, allowing said flaps to move up and down with abutting parts of a truck body reducing wear and strain on said head and side panels.

10. The loading dock shelter of claim 1 wherein said support means supports said head panel outwardly from said wall means for preventing damage to said wall caused by the impact of a truck with said wall as said truck backs up against said head panel.

11. The loading dock shelter of claim 1 wherein said retaining means includes a sleeve substantially encircling said flexible elastic restraining means, allowing said restraining means to stretch along its length pulling additional portions of said restraining means through said sleeve.

* * * * *